March 27, 1956

W. G. EVANS ET AL 2,740,086

ELECTRICAL CONTROL APPARATUS

Filed Jan. 28, 1955

March 27, 1956     W. G. EVANS ET AL     2,740,086
ELECTRICAL CONTROL APPARATUS

Filed Jan. 28, 1955     2 Sheets-Sheet 2

United States Patent Office 2,740,086
Patented Mar. 27, 1956

2,740,086
ELECTRICAL CONTROL APPARATUS

William G. Evans and Robert I. Van Nice, Pittsburgh, and William G. Hall, Wilkinsburg, Pa., assignors to Westinghouse Electric Corporation, East Pittsburgh, Pa., a corporation of Pennsylvania Application January 28, 1955, Serial No. 484,632

9 Claims. (Cl. 322—28)

This invention relates to electrical control apparatus and, more particularly, to regulator systems.

It is old in the art to control the resistance of the control circuit of a magnetic amplifier by means of a mechanical switch. However, when such a combination is utilized in either a control system or a regulator system certain disadvantages are obtained. For instance, owing to the slow speed of response of the mechanical switch the output from either the control or regulator system does not accurately follow the magnitude of the input control signal. Further, the slow speed of response of the mechanical switch effects a slow speed of response for the overall control or regulator system.

An object of this invention is to provide a control circuit having a high speed of response and one whose output signal accurately follows changes in the magnitude of its input control signal.

A specific object of this invention is to provide for so controlling the resistance in the control circuit of a magnetic amplifier that the output voltage of the magnetic amplifier accurately follows changes in the magnitude of the input control signal which controls the resistance of the control circuit.

Another specific object of this invention is to provide for so synchronizing the supply voltage applied to a magnetic amplifier with an alternating voltage applied to a control circuit controlling the resistance of the control circuit of the magnetic amplifier that the output of the magnetic amplifier accurately follows the magnitude of the control signal applied to the control circuit.

Other objects of this invention become apparent from the following description when taken in conjunction with the accompanying drawings in which.

Figure 4:
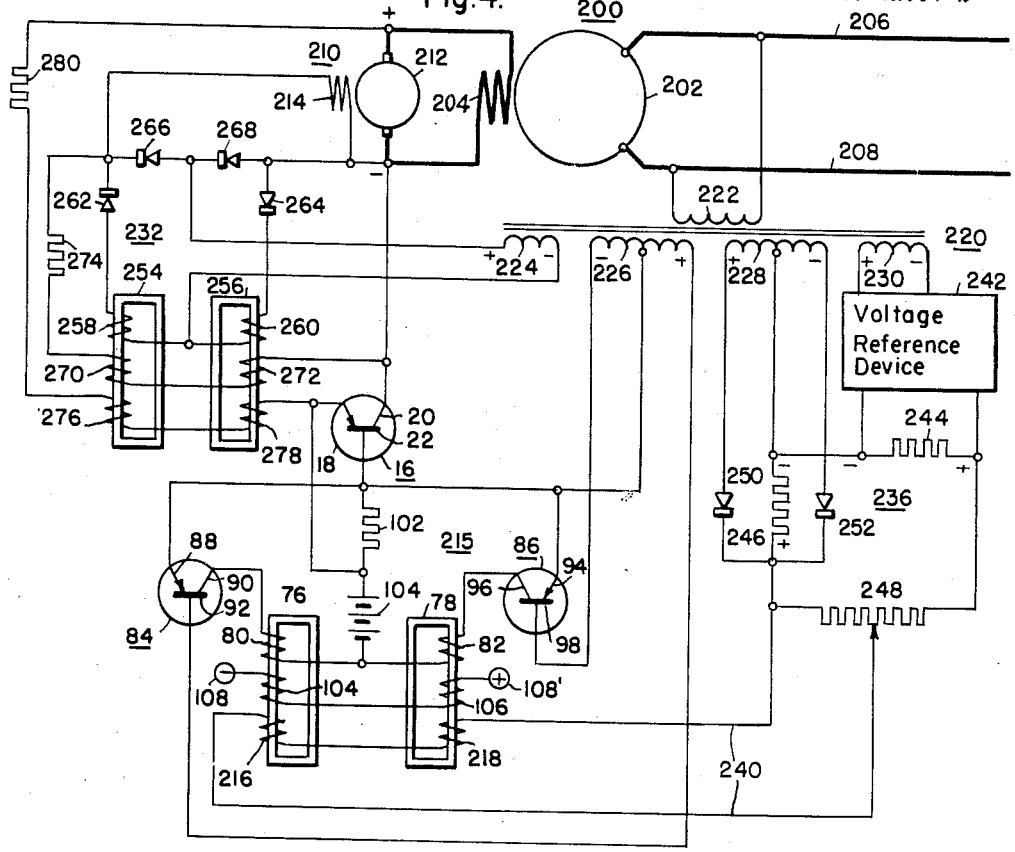
Fig. 4 is a schematic diagram of apparatus and circuits illustrating the application of this invention to a regulator system.
Figure 5:
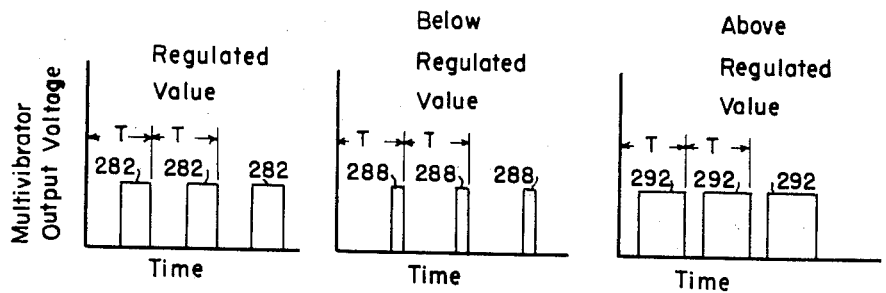
Figure 6:
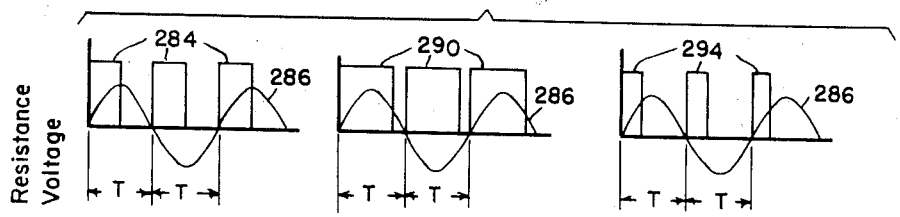

Fig. 5 is a graph illustrating the periodic output voltages from the multivibrator illustrated in Fig. 4 for various magnitudes in the output voltage of the generator illustrated in Fig. 4; and Fig. 6 is a graph illustrating the manner in which periodic output pulses of the multivibrator illustrated in Fig. 4 are synchronized with the supply voltage applied to the magnetic amplifier illustrated in Fig. 4.

Figure 1:
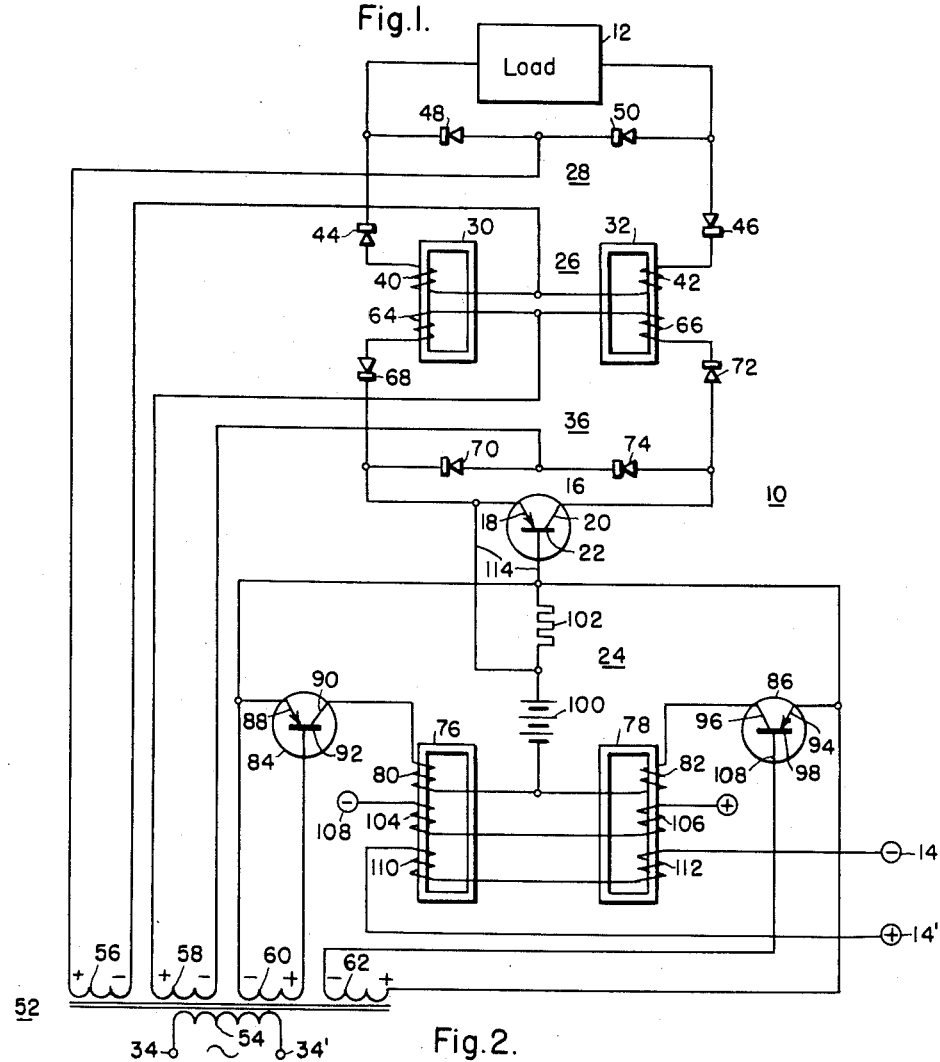
Figure 1 is a schematic diagram of apparatus and circuits illustrating the application of this invention to a control circuit in general.

Referring to Fig. 1 there is illustrated a control system 10 for controlling the supply of current to a load 12 in accordance with the magnitude of a control voltage applied to the input control terminals 14 and 14'. In general, the control system 10 comprises a semiconductive device, specifically a PNP junction type transistor 16 having an emitter electrode 18, a collector electrode 20, and a base electrode 22; a pulse width modulator or multivibrator 24 for controlling the operation of the transistor 16 in such a manner that the transistor 16 operates as a switch; and a magnetic amplifier 26 the resistance of whose control circuit is controlled in accordance with the on-off time of the transistor 16.

Broadly speaking, the pulse width modulator 24 is such as to produce at its output, specifically between the emitter and base electrodes 18 and 22, a plurality of periodic pulses, the width of which vary in accordance with the magnitude of the direct-current control voltage applied to the input control terminals 14 and 14'. In order that the transistor 16 functions as a switch, the magnitude of the periodic pulses applied to the transistor 16 are such as to always effect a substantially complete saturation of the transistor 16. In operation, the magnitude of the periodic output pulses of the multivibrator 24 can vary provided they are of such magnitude to effect a saturation of the transistor 16. Of course, the magnitude of the periodic output pulses of the multivibrator 24 can not be so great as to burn out the transistor 16.

The magnetic amplifier 26 illustrated in Fig. 1 has a high speed of response and is such that the resistance in its control circuit can be decreased to a very low value without decreasing its speed of response. Broadly, the magnetic amplifier 26 comprises a load circuit 28 for alternatively driving the magnetic core members 30 and 32 to saturation during alternate half-cycles of the alternating voltage applied to the terminals 34 and 34'; and a control circuit 36 for alternately effecting a resetting of the flux level in the magnetic core members 30 and 32 in accordance with the on-off time of the transistor 16, to thus vary the magnitude of the output current of the magnetic amplifier 26 to the load 12.

Load windings 40 and 42 are disposed in inductive relationship with the magnetic core members 30 and 32, respectively. In order to produce self-saturation for the magnetic amplifier 26 self-saturating rectifiers 44 and 46 are connected in series circuit relationship with the load windings 40 and 42, respectively. For the purpose of producing direct current for the load 12 load rectifiers 48 and 50 are interconnected with the load 12 and with the various components of the load circuit 28. Supply voltage for the load windings 40 and 42 is received from a potential transformer 52 having a primary winding 54 and secondary winding sections 56, 58, 60 and 62. In particular, the secondary winding section 56 of the transformer 52 is interconnected with the load rectifiers 48 and 50 and with the series circuits one of which includes the load winding 40 and the self-saturating rectifier 44 and the other of which includes the load winding 42 and the self-saturating rectifier 46. The manner in which the load windings 40 and 42 alternately drive their respective magnetic core members 30 and 32 to saturation will be explained hereinafter.

The control circuit 36 includes control windings 64 and 66 which are disposed in inductive relationship with the magnetic core members 30 and 32, respectively. Also included in the control circuit 36 are control rectifiers 68, 70, 72 and 74 which are so interconnected with the control windings 64 and 66 and with the transistor 16 that the transistor 16 is able to vary the effective resistance in the control circuit 36 during each half-cycle of alternating voltage applied to the terminals 34 and 34'. In effect, the transistor 16 functions as a resistance whose effective value over each half-cycle of the alternating voltage applied to the terminals 34 and 34' is varied in accordance with the width of the periodic output pulses of the pulse width modulator 24. In other words, the periodic output pulses of the pulse width modulator 24 control the instantaneous voltage between the emitter and collector electrodes 18 and 20 of the transistor 16 and thus the instantaneous voltage applied by the control circuit 36 to the magnetic amplifier 26 to effect an alternate resetting of the flux level in the magnetic core members 30 and 32, respectively.

A supply voltage for effecting an alternate resetting of the flux levels in the magnetic core members 30 and 32 is received from the secondary winding 58 of the potential transformer 52. In operation, the current flow through the control windings 64 and 66, as received from the secondary winding section 58, effects magnetomotive forces with respect to the magnetic core members 30 and 32 which oppose the magnetomotive forces produced by the current flow through the associated load windings 40 and 42, respectively.

The pulse width modulator 24 shown in Fig. 1 is a transistorized magnetic amplifier type, however, it is to be understood that other suitable types of pulse width modulators or multivibrators which produce the desired periodic output pulses could be substituted therefor. In this instance, the pulse width modulator 24 comprises magnetic core members 76 and 78 which have disposed in inductive relationship therewith load windings 80 and 82. In practice, the magnetic core members 76 and 78 are constructed of rectangular looped core materials so that the trailing and leading edges of the periodic pulses produced between the emitter and base electrodes 18 and 20 of the transistor 16 shall be substantially vertical. This is necessary in order to effect a rapid on-off operation of the transistor 16. If such were not the case the transistor 16 would operate as a class "A" amplifier.

In order to control the flow of current through the load windings 80 and 82 switching transistors 84 and 86, respectively, are provided. As illustrated, the switching transistor 84 comprises an emitter electrode 88, a collector electrode 90, and a base electrode 92. On the other hand, the switching transistor 86 comprises an emitter electrode 94, a collector electrode 96, and a base electrode 98.

For the purpose of effecting a flow of current through the load windings 80 and 82, a source of direct current 100 is interconnected with the load windings 80 and 82 and with the switching transistors 84 and 86. In particular, the collector electrode 90 and the emitter electrode 88 of the switching transistor 84 are connected in series circuit relationship with the load winding 80 and with a load resistor 102, the series circuit being connected across the direct-current source 100. On the other hand, the collector electrode 96 and the emitter electrode 94 of the switching transistor 86 are connected in series circuit relationship with the load winding 82 and with the load resistor 102, this series circuit likewise being connected across the direct-current source 100.

In order to bias the magnetic core members 76 and 78 to cut off, bias windings 104 and 106 are disposed in inductive relationship with the magnetic members 76 and 78, respectively. Energy for the bias windings 104 and 106 is received from terminals 108, 108' which have applied thereto a suitable substantially constant direct-current voltage. In this instance, the bias windings 104 and 106 are connected in series circuit relationship with one another, the series circuit being connected to the terminals 108 and 108'. In operation, the current flow through the bias windings 104 and 106 produces magnetomotive forces with respect to the magnetic core members 76 and 78, respectively, which oppose the magnetomotive forces produced with respect to these core members by the current flow through the associated load windings 80 and 82, respectively.

For the purpose of alternately rendering the switching transistors 84 and 86 conductive to thus alternately saturate the magnetic core members 76 and 78, respectively, the secondary winding sections 60 and 62 of the potential transformer 52 are interconnected with the switching transistors 84 and 86, respectively. The secondary winding section 60 is connected to the emitter electrode 88 and to the base electrode 92 of the switching transistor 84 so as to render the switching transistor 84 conductive during alternating half-cycles of the voltage applied to the terminals 34 and 34'. On the other hand, the secondary winding section 62 of the transformer 52 is connected to the emitter electrode 94 and to the base electrode 98 of the switching transistor 86 so as to render the switching transistor 86 conductive during the other alternate half-cycles of the voltage applied to the terminals 34 and 34'.

The flux level in the magnetic core members 76 and 78 is determined by the magnitude of the current flow through control windings 110 and 112 which are disposed in inductive relationship with the magnetic core members 76 and 78, respectively. As illustrated, the control windings 110 and 112 are connected in series circuit relationship with one another, the series circuit being connected to the input control terminals 14 and 14'. In operation, the current flow through the control windings 110 and 112 produces magnetomotive forces with respect to their associated magnetic core members 76 and 78 that aid the magnetomotive forces produced by the current flow through their associated load windings 80 and 82, respectively. The manner in which the current flow through the control windings 110 and 112 controls the width of the periodic pulses applied between the emitter and base electrodes 18 and 22 of the transistor 16 will be described hereinafter.

Circuit means 114 is provided for interconnecting two of the electrodes of the transistor 16 with the output of the pulse width modulator 24. Specifically, one end of the load resistor 102 is connected to the emitter electrode 18 of the transistor 16 and the other end of the load resistor 102 is connected to the base electrode 22. By so interconnecting the output of the pulse width modulator 24 with the transistor 16, a maximum of power again is obtained from the transistor 16. Further, by so interconnecting the output of the pulse width modulator 24 with the transistor 16, the power dissipation in the transistor 16 is minimized.

In practice, the transistor 16 is preferably of the junction type in order to obtain a minimum of the power dissipation in the transistor. The reason for such a minimum power dissipation in the transistor 16 is that it is interconnected with the pulse width modulator 24 in a particular manner and is operated in a switching mode of operation so that the forward voltage drop across the electrodes 18 and 20 is extremely small when current is flowing therethrough.

In order that the magnitude of the current flow through the load 12 accurately follows the magnitude of the direct-current voltage applied to the input control terminals 14 and 14', the periodic output pulses of the pulse width modulator 24 are synchronized with the supply voltage applied to the magnetic amplifier 26. In particular, the alternating voltages applied to the switching transistors 84 and 86 of the pulse width modulator 24 are synchronized with the alternating voltages applied to the load and control circuits 28 and 36 of the magnetic amplifier 26.

Figure 2:
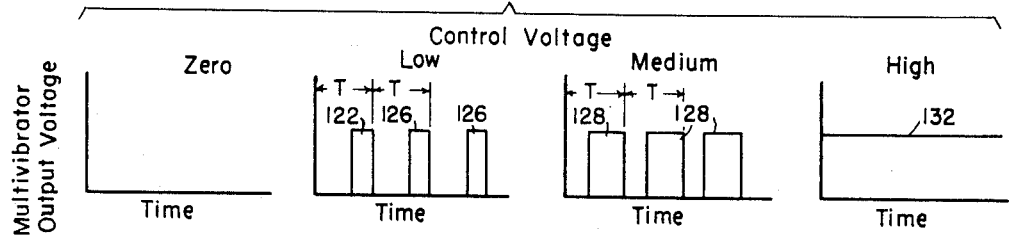
Fig. 2 is a graph illustrating the periodic output pulses from the multivibrator illustrated in Fig. 1 for varying magnitudes of input control signals applied to the multivibrator.

The operation of the apparatus shown in Fig. 1 will now be described. Assuming the control voltage applied to the input control terminals 14 and 14' is of zero magnitude, then the output voltage appearing across the load resistor 102 of the pulse width modulator 24 will likewise be of zero magnitude. The reason for this is that the current flow through the bias windings 104 and 106 drives the magnetic core members 76 and 78 to cut off, and therefore substantially all of the voltage is absorbed across the load windings 80 and 82 in driving their respective core members 76 and 78 towards saturation. The first graph shown in Fig. 2 illustrates the fact that the output voltage from the pulse width modulator 24 is of zero magnitude when the direct-current control voltage applied to the input control terminals 14 and 14' is of zero magnitude.

When the voltage across the load resistor 102 and thus between the emitter electrode 18 and the base electrode 22 of the transistor 16 remains at zero magnitude, the transistor 16 is maintained non-conductive. If the transistor 16 remains non-conductive during each half-cycle of the alternating voltage applied to the terminals 34 and 34' substantially all of the voltage appearing across the secondary winding section 58 of the transformer 52 appears between the emitter and collector electrodes 18 and 20 of the transistor 16 and substantially no voltage appears across either the control windings 64 or the control winding 66 to effect a resetting of the flux level in the respective magnetic core members 30 and 32. Therefore when the control voltage applied to the terminals 14 and 14' is of zero magnitude the magnetic core members 30 and 32 of the magnetic amplifier 26 remain saturated during each half-cycle of the alternating voltage applied to the terminals 34 and 34', and therefore the current flow through the load 12 is at a maximum.

When the polarity of the voltage across the secondary winding section 56 of the transformer 52 is as shown in Fig. 1 current flows from the left end of the secondary winding section 56, as shown, through the load rectifier 48, the load 12, the self-saturating rectifier 46, and the load winding 42, to the right end of the secondary winding section 56. Since under the assumed conditions the magnetic core members 30 and 32 are already saturated substantially no voltage is absorbed across the load winding 42. On the other hand, when the polarity of the voltage across the secondary winding section 56 is reversed from that shown in Fig. 1 current flows from the right end of the secondary winding section 56, as shown, through the load winding 40, the self-saturating rectifier 44, the load 12, and the load rectifier 50, to the left end of the secondary winding section 56 of the transformer 52. Under this assumed condition of control voltage of zero magnitude applied to the terminals 14 and 14', substantially no voltage is absorbed across the load winding 40.

Figure 3:
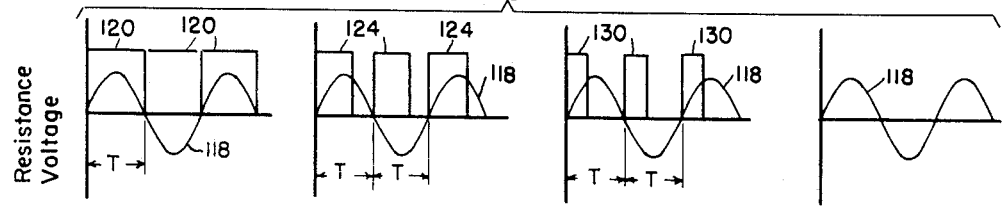
Fig. 3 is a graph illustrating the synchronization between the periodic output pulses of the multivibrator illustrated in Fig. 1 with the supply voltage applied to the magnetic amplifier illustrated in Fig. 1.

Referring to Fig. 3 the synchronism between the alternating voltages applied to the pulse width modulator 24 and to the magnetic amplifier 26 can more clearly be seen. For instance, a sine wave 118 represents the alternating voltages applied to the magnetic amplifier 26 from the secondary winding sections 56 and 58 of the potential transformer 52. The curves 120 represent the resistance between the emitter and collector electrodes 18 and 20 of the transistor 16 during each half-cycle of the alternating voltages applied to the magnetic amplifier 26. As can be seen from the first graph illustrated in Fig. 3 when the control voltage applied to the terminals 14 and 14' is of zero magnitude, the resistance between the emitter and collector electrodes 18 and 20 remains high throughout each half-cycle of the alternating voltages applied to the magnetic amplifier 26.

Assuming the direct-current control voltage applied to the terminals 14 and 14' is increased to a predetermined value so as to change the flux level in the magnetic core members 76 and 78 to a predetermined point above cut off, then periodic pulses are applied between the emitter and base electrodes 18 and 22 of the transistor 16, to thereby render the transistor 16 conductive. In particular, when the voltage across the secondary winding section 62 of the transformer 52 is of a polarity as shown, current flows from the positive terminal of the direct-current source 100 through the load resistor 102, the emitter and collector electrodes 94 and 96 of the switching transistor 86, and the load winding 82, to the negative terminal of the direct-current source 100. Such an action effects a saturation of the magnetic core member 78.

When the magnetic core member 78 saturates, a voltage pulse appears between the emitter and base electrodes 18 and 22 of the transistor 16, to thereby render the transistor 16 conductive. This output pulse appearing between the emitter and base electrodes 18 and 22 of the transistor 16 is represented by a pulse 122 shown in the second graph of Fig. 2.

Up until the transistor 16 is rendered conductive, the resistance between the emitter and collector electrodes 18 and 20 of the transistor 16 remains high, and this is represented by curves 124 shown in the second graph of Fig. 3. However, as is shown in this second graph of Fig. 3 when the transistor 16 is rendered conductive, the resistance between the emitter and collector electrodes 18 and 20 decreases to substantially zero magnitude. During the half-cycle of the alternating voltages applied to the magnetic amplifier 26 when the resistance between the emitter and collector electrodes 18 and 20 is high, as represented by the curves 124, substantially no reset in the flux level in the magnetic core members 30 and 32 of the magnetic amplifier 26 takes place. However, assuming the polarity of the voltage across the secondary winding section 58 is as shown in Fig. 1 and assuming the pulse 122 appearing at the output of the pulse width modulator 24 renders the transistor 16 conductive, then a voltage appears across the control winding 64 of the magnetic amplifier 26 to thereby effect a resetting of the flux level in the magnetic core member 30 since during this portion of the half-cycle of the voltage applied to the terminals 34 and 34', current is flowing through the transistor 16 and substantially no voltage appears between the emitter and collector electrodes 18 and 20. When the transistor 16 is rendered conductive and the polarity of the voltage across the secondary winding section 58 is as shown, current flows from the left end of the secondary winding section 58, as shown, through the control winding 64, the control rectifier 68, the emitter and collector electrodes 18 and 20 of the transistor 16, and the control rectifier 74, to the right end of the secondary winding section 58 of the transformer 52.

Still assuming that the direct-current control voltage applied to the terminals 14 and 14' has increased to a predetermined value, current also flows through the load winding 42 of the magnetic amplifier 26 to drive its core member 32 to saturation during the same half-cycle of operation when the magnetic core member 30 is being reset to a predetermined flux level. In particular, during this assumed half-cycle of operation, current flows from the left end of the secondary winding section 56, as shown, through the load rectifier 48, the load 12, the self-saturating rectifier 46, and the load winding 42, to the right end of the secondary winding section 56 of the transformer 52.

During the next half-cycle of operation when the polarity of the voltages across the secondary winding sections 56, 58, 60 and 62 of the transformer 52 is reversed from that shown in Fig. 1, the switching transformer 84 of the pulse width modulator 24 is rendered conductive. When the switching transistor 84 is rendered conductive, current flows from the positive terminal of the direct-current source 100 through the load resistor 102, the emitter and collector electrodes 88 and 90 of the switching transistor 84, and the load winding 80, to the negative terminal of the direct-current source 100. Such an action effects a saturation of the magnetic core member 76. When the magnetic core member 76 saturates, a voltage pulse is again produced between the emitter and base electrodes 18 and 22 of the transistor 16. This latter pulse appearing between the emitter and base electrodes 18 and 22 is illustrated in Fig. 2 by a pulse 126.

During this same half-cycle of operation when the polarity of the voltages across the secondary winding sections 56, 58, 60 and 62 of the transformer 52 are reversed from that shown in Fig. 1, current flows from the right end of the secondary winding section 58 through the control rectifier 70, the emitter and collector electrodes 18 and 20 of the transistor 16, the control rectifier 72, and the control winding 66, to the left end of the secondary winding section 58. Of course, this current flow does not take place until the transistor 16 is rendered conductive by the pulse 126 being applied between its emitter and base electrodes 18 and 22. The current flow through the control winding 66 of the magnetic amplifier 26 effects a resetting of the flux level in the magnetic core member 32 to a predetermined level.

During the same half-cycle of operation when the polarity of the voltage across the secondary winding section 58 is reversed from that shown in Fig. 1, current flows from the right end of the secondary winding section 56 through the load winding 40, the self-saturating rectifier 44, the load 12, and the load rectifier 50, to the left end of the secondary winding section 56. Such an action drives the magnetic core member 30 to saturation, and the magnitude of current flow through the load 12 is determined by the amount the magnetic core member 30 has been reset during the previous half-cycle.

As the magnitude of the direct-current control voltage applied to the terminals 14 and 14' increases, the flux level in the magnetic core members 76 and 78 is reset to a higher level, and thus the width of the voltage pulses applied between the emitter and base electrodes 18 and 22 of the transistor 16 increases, to thereby increase the on-time of the switching transistor 16 as compared to its off-time. The pulses of increased width are represented in the third graph of Fig. 2 as curves 128. On the other hand, the resistance between the emitter and collector electrodes 18 and 20 of the transistor 16 when the pulses 128 are applied to the transistor 16 are as represented by curves 130 showing in Fig. 3. Since the on-time of the transistor 16 has been increased further as compared to its off-time, the magnetic core members 30 and 32 of the magnetic amplifier 26 are reset to a lower flux level and thus the magnitude of the current flow through the load 12 is further decreased.

If the control voltage applied to the terminals 14 and 14' is increased so as to hold the flux level in the magnetic core members 76 to 78 at saturation in the positive direction, then the output voltage from the pulse width modulator 24 is at a maximum. This is illustrated by the curve 132 shown in Fig. 2. Under such assumed conditions the resistance between the emitter and collector electrodes 18 and 20 of the transistor 16 is substantially zero throughout each half-cycle of the alternating voltages applied to the magnetic amplifier 26. Therefore, the magnetic core members 30 and 32 of the magnetic amplifier 26 are completely reset to negative saturation and thus the output current to the load 12 is of substantially zero magnitude.

It is to be noted that during each half-cycle of the alternating voltages applied to the magnetic amplifier 26, as represented by time T in Figs. 2 and 3, an output pulse from the pulse width modulator 24 occurs, provided sufficient control voltage is applied to terminals 14 and 14'. Thus, the resistance between the emitter and collector electrodes 18 and 20 of the transistor 16 is changed during each half-cycle of the alternating voltages applied to the magnetic amplifier 26. In other words, the alternating voltages applied to the pulse width modulator 24 are synchronized with the alternating voltages applied to the magnetic amplifier 26. Such being the case, the magnitude of the current flow through the load 12 accurately follows during each half-cycle of operation the magnitude of the direct-current control voltage applied to the input control terminals 14 and 14'.

The operating frequency of the pulse width modulator 24 can be increased to multiples of the frequency of the alternating voltages applied to the magnetic amplifier 26. In other words, the frequency of operation of the pulse width modulator 24 can be increased so that more than one pulse, such as the pulse 122, occurs during each half-cycle of the alternating voltages applied to the magnetic amplifier 26. By going to such a multiple frequency of operation for the pulse width modulator 24, the speed of response of the pulse width modulator 24 is maintained high, however, the gain of the pulse width modulator 24 is increased. Thus, the gain of the overall control system 10 is increased without sacrificing anything as regards to speed of response.

Referring to Fig. 4, this invention is illustrated with reference to a regulator system for maintaining an electrical output condition of an alternating-current generator 200 substantially constant. In particular, the regulator system maintains the magnitude of the output voltage of the generator 200 substantially constant. As illustrated, the generator 200 comprises an armature 202 and a field winding 204, the armature 202 supplying energy to load conductors 206 and 208. The operation of the generator 200 is controlled by a direct-current exciter 210 having an armature 212 and a field winding 214. In order to simplify the description, like components of Figs. 1 and 4 have been given the same reference characters.

As can be seen from Figs. 1 and 4, the pulse width modulator 215 illustrated in Fig. 4 is the same as the pulse width modulator 24 illustrated in Fig. 1 except that the control windings 216 and 218 are wound oppositely on the magnetic core members 76 and 78, respectively. Also, the current flow through the bias windings 104 and 106 of the apparatus of Fig. 4 is such as to bias the magnetic core members 76 and 78, respectively, to approximately half output. In addition, the switching transistors 84 and 86 shown in Fig. 4 are controlled from the output voltage of the generator 200. In particular, the switching transistors 84 and 86 are controlled through a potential transformer 220 having a primary winding 222 connected to load conductors 206 and 208; and secondary winding sections 224, 226, 228 and 230.

In general, the regulator system illustrated in Fig. 4 comprises a magnetic amplifier 232 which controls the magnitude of the current flow through the field winding 214 of the exciter 210; the transistor 16 which controls the magnitude of the output current of the magnetic amplifier 232; the pulse width modulator 215; sensing means 236 for obtaining a control signal which varies in accordance with the deviation of the output voltage of the generator 200 from its regulated value; and circuit means 240 for applying the control signal to the control windings 216 and 218 of the pulse width modulator 215, to thereby control its operation in accordance with the deviation in the output voltage of the generator 200 from its regulated value.

The sensing circuit 236 includes a voltage reference device 242 for producing across a resistor 244 a voltage which remains substantially constant irrespective of the magnitude or frequency of the output voltage of the generator 200; a resistor 246 across which is produced a direct-current voltage which varies in accordance with the magnitude of the output voltage of the generator 200; and an adjustable resistor 248 for obtaining a measure of the difference in the direct-current voltages appearing across the resistors 244 and 246. In this instance, the direct-current voltage across the resistor 246 is produced by means of the rectifiers 250 and 252.

As illustrated, the magnetic amplifier 232 comprises magnetic core members 254 and 256 which have disposed in inductive relationship therewith load windings 258 and 260, respectively. In order to permit current to flow in only one direction through the load windings 258 and 260 and thus produce self-saturation for the magnetic amplifier 232, self-saturating rectifiers 262 and 264 are connected in series circuit relationship with the load windings 258 and 260, respectively. Direct current flow through the field winding 214 of the direct-current exciter 210 is produced by means of the load rectifiers 266 and 268.

For the purpose of producing positive feedback for the magnetic amplifier 232, feedback windings 270 and 272 are connected in series circuit relationship with one another, the series circuit being connected across the output of the magnetic amplifier 232. As illustrated, the feedback windings 270 and 272 are so disposed on their respective magnetic core members 254 and 256 that current flow therethrough produces magnetomotive forces with respect to their associated magnetic core members 254 and 256 that aid the magnetomotive forces produced with respect to these core members by the current flow through the associated load windings 258 and 260. A current limiting resistor 274 is connected in series circuit relationship with the feedback windings 270 and 272 in order to limit the current flow through the feedback windings 270 and 272 when the respective magnetic core members 254 and 256 become saturated.

In operation, the magnitude of the output current of the magnetic amplifier 232 is controlled in accordance with the magnitude of the voltage appearing across the control circuit including control windings 276 and 278 which are disposed in inductive relationship with the magnetic core members 254 and 256, respectively. In particular, the control windings 276 and 278 and the emitter and collector electrodes 18 and 20 of the transistor 16 are interconnected with the armature 212 of the exciter 210, so that the armature 212 effects a voltage across the control windings 276 and 278. A current limiting resistor 280 is also connected in series circuit relationship with control windings 276 and 278 in order to limit the magnitude of the current flow through the control windings 276 and 278 when the magnetic core members 254 and 256 become saturated. By supplying the control windings 276 and 278 of the magnetic amplifier 232 from the output of the exciter 210, the amplifier-exciter response time is much faster than that of the exciter 210 alone.

The operation of the apparatus illustrated in Fig. 4 will now be described. Assuming the output voltage of the generator 200 is at its regulated value, then the magnitude of the voltage across the resistor 248 is zero, and thus the magnitude of the current flow through the control windings 216 and 218 of the pulse width modulator 215 is likewise zero. When the current flow through the control windings 216 and 218 is of zero magnitude output pulses are produced between the emitter and base electrodes 18 and 22 of the transistor 16 as represented by the pulses 282 shown in the first graph of Fig. 5.

Thus as illustrated by curves 284 in Fig. 6, the resistance between the emitter and collector electrodes 18 and 20 of the transistor 16 remains high during the first half of each half-cycle of alternating voltage 286 as applied to the magnetic amplifier 232. Then during the last half of each half-cycle of the alternating voltage applied to the magnetic amplifier 232, the transistor 16 remains conductive. When the transistor 16 is conductive, substantially all of the voltage from the output of the exciter 210 appears across the control windings 276 and 278, to thereby effect a resetting of the flux level in the magnetic core members 254 and 256 to approximately half output, to thus produce approximately half output from the magnetic amplifier 232 to the field winding 214 of the exciter 210. In other words, the periodic pulses appearing between the emitter and base electrodes 18 and 22 of the transistor 16 control the instantaneous voltage between the emitter and collector electrodes 18 and 20 and thus the instantaneous voltage applied by the control windings 276 and 278 to the magnetic amplifier 232.

Assuming the magnitude of the output voltage of the generator 200 decreases to a value below its regulated value, then current flows from the tapped portion of the resistor 248 through the control windings 216 and 218 of the pulse width modulator 215 to the left end of the resistor 248, as shown. Such an action resets the flux level in the magnetic core members 76 and 78 to a lowered level and thus effects a decrease in the width of the output pulses appearing between the emitter and base electrodes 18 and 22 of the transistor 16. These output pulses appearing between the emitter and base electrodes 18 and 22 when the output voltage of the generator 200 is below its regulated value are represented by pulses 288 shown in the second graph of Fig. 5. As can be seen from the second graph of Fig. 6, the resistance between the emitter and collector electrodes 18 and 20 is high during the greater portion of each half-cycle of the alternating voltage applied to the magnetic amplifier 232. This resistance is represented by curves 290. Thus, a voltage appears across the control windings 276 and 278 for a lesser time than when the output voltage of the generator 200 is at its regulated value, and therefore, the magnetic core members 254 and 256 are not reset to as low a flux level, and thus, the output current of the magnetic amplifier 232 is increased. With an increase in the output current of the magnetic amplifier 232, the current flow through the field winding 214 of the exciter 210 is increased, to thereby return the output voltage of the generator 200 to its regulated value.

Assuming the output voltage of the generator 200 increases to a value above its regulated value, then current flows from the left end of the resistor 248, as shown, through the control windings 218 and 216 of the pulse width modulator 215, to the tapped portion of the resistor 248. Such an action effects an increase in the width of the periodic pulses appearing between the emitter and base electrodes 18 and 22 of the transistor 16. These pulses are represented in the third graph of Fig. 5 by the pulses 292. Thus, the resistance between the emitter and collector electrodes 18 and 20 is high during less than half of each half-cycle of the alternating voltage applied to the magnetic amplifier 232. This is represented by curves 294 shown in the third graph of Fig. 6.

With the on-time of the transistor 16 greater than its off-time the magnetic core members 254 and 256 are reset to a lower flux level than is the case when the generator 200 is at its regulated value. Such being the case the output current of the magnetic amplifier 232 is decreased, to thereby decrease the magnitude of the current flow through the field winding 214 of the exciter 210, and thus return the output voltage of the generator 200 to its regulated value.

It is to be noted that the periodic pulses appearing between the emitter and base electrodes 18 and 22 of the transistor 16 are synchronized with the alternating supply voltage applied to the magnetic amplifier 232. In other words, the alternating voltage appearing across the secondary winding section 226 of the potential transformer 220 is synchronized with the alternating supply voltage appearing across the secondary winding section 224, the latter supply voltage being applied to the magnetic amplifier 232. By so synchronizing these alternating voltages the magnitude of the current flow through the field winding 214 of the exciter 210 accurately follows the control voltage applied to the control windings 216 and 218 of the pulse width modulator 215 during each half-cycle of operation.

It is to be understood that the frequency of the voltage appearing across the secondary winding section 226 of the transformer 220 can be a multiple of the frequency of the voltage appearing across the secondary winding section 224 of the transformer 220. By going to such a multiple frequency the speed of response of the pulse width modulator 215 is maintained high and yet the gain of the pulse width modulator 215 is increased, thereby increasing the gain of the overall regulator system.

The apparatus embodying the teachings of this invention has several advantages. For instance, it produces an output current the magnitude of which accurately follows the magnitude of the input control signal during each half-cycle of operation. In addition, both the control systems illustrated in Figs. 1 and 4 have a high speed of response. Further, the components which go to make up the control systems illustrated in Figs. 1 and 4 comprise no moving parts. Therefore, maintenance problems are minimized. Also in the apparatus shown in Fig. 4 the response time of the regulator system is improved, that is, a higher speed of response obtained, by rendering the control windings 276 and 278 of the magnetic amplifier 232 responsive to the output voltage of the exciter 210.

A further advantage of the apparatus of this invention is that pulse width control of the transistor 16 is utilized. Therefore, the changes in the magnitude of the pulse applied between the emitter and base electrodes 18 and 22 do not effect the magnitude of the current flow through the field winding 214 of the exciter 210. Thus, the pulse width modulators 24 and 215 can be located at a considerable distance from particular transistor 16.

Since numerous changes may be made in the above apparatus and circuits, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a control system for controlling the supply of energy to a load, the combination comprising, a magnetic amplifier having an output and a control circuit for varying the magnitude of the output current of the magnetic amplifier, the output of the magnetic amplifier being interconnected with the load, a semi-conductive device having three electrodes, two of the three electrodes being connected in circuit relationship with said control circuit, control means having an input and an output, said control means being such as to produce at its output periodic pulses the width of which vary in accordance with the magnitude of a control signal applied to the input of the said control means, and circuit means for interconnecting the remaining electrode of the semiconductive device and one of said two electrodes with the output of the said control means, so that said periodic pulses control the instantaneous voltage across the said two electrodes of the semiconductive device and thus the instantaneous voltage applied by said control circuit to the magnetic amplifier.

2. In a control system for controlling the supply of energy to a load, the combination comprising, a magnetic amplifier having an output and a control circuit for varying the magnitude of the output current of the magnetic amplifier, the output of the magnetic amplifier being interconnected with the load, a junction type transistor having three electrodes, two of the three electrodes being connected in circuit relationship with said control circuit, control means having an input and an output, said control means being such as to produce at its output periodic pulses the width of which vary in accordance with the magnitude of a control signal applied to the input of the said control means, and circuit means for interconnecting the remaining electrode of the junction type transistor and one of said two electrodes with the output of the said control means, so that said periodic pulses control the instantaneous voltage across the said two electrodes of the junction type transistor and thus the instantaneous voltage applied by said control circuit to the magnetic amplifier.

3. In a control system for controlling the supply of energy to a load, the combination comprising, a magnetic amplifier having an output and a control circuit for varying the magnitude of the output current of the magnetic amplifier, the output of the magnetic amplifier being interconnected with the load, a junction type transistor having an emitter electrode, a collector electrode, and a base electrode, the emitter electrode and the collector electrode being connected in circuit relationship with said control circuit, control means having an input and an output, said control means being such as to produce at its output periodic pulses the width of which vary in accordance with the magnitude of a control signal applied to the input of the said control means, and circuit means for interconnecting the base electrode and the emitter electrode with the output of the said control means, so that said periodic pulses control the instantaneous voltage between the emitter and the collector electrodes and thus the instantaneous voltage applied by said control circuit to the magnetic amplifier.

4. In a control system for controlling the supply of energy to a load, the combination comprising, a magnetic amplifier having an output and a control circuit for varying the magnitude of the output current of the magnetic amplifier, the output of the magnetic amplifier being interconnected with the load, means for applying a supply voltage to the magnetic amplifier, a semiconductive device having three electrodes, two of the three electrodes being connected in circuit relationship with said control circuit, control means having an input and an output, said control means being such as to produce at its output periodic pulses the width of which vary in accordance with the magnitude of a control signal applied to the input of the said control means, said periodic pulses being synchronized with said supply voltage applied to the magnetic amplifier, and circuit means for interconnecting the remaining electrode of the semiconductive device and one of said two electrodes with the output of the said control means so that said periodic pulses control the instantaneous voltage across the said two electrodes of the semiconductive device and thus the instantaneous voltage applied by said control circuit to the magnetic amplifier.

5. In a control system for controlling the supply of energy to a load, the combination comprising, a magnetic amplifier having an output and a control circuit for varying the magnitude of the output current of the magnetic amplifier, the output of the magnetic amplifier being interconnected with the load, means for applying a supply voltage to the magnetic amplifier, a junction type transistor having three electrodes, two of the three electrodes being connected in circuit relationship with said control circuit, control means having an input and an output, said control means being such as to produce at its output periodic pulses the width of which vary in accordance with the magnitude of a control signal applied to the input of the said control means, said periodic pulses being synchronized with said supply voltage applied to the magnetic amplifier, and circuit means for interconnecting the remaining electrode of the junction type transistor and one of said two electrodes with the output of the said control means, so that said periodic pulses control the instantaneous voltage across the said two electrodes of the junction type transistor and thus the instantaneous voltage applied by said control circuit to the magnetic amplifier.

6. In a control system for controlling the supply of energy to a load, the combination comprising, a magnetic amplifier having an output and a control circuit for varying the magnitude of the output current of the magnetic amplifier, the output of the magnetic amplifier being interconnected with the load, means for applying a supply voltage to the magnetic amplifier, a junction type transistor having an emitter electrode, a collector electrode, and a base electrode, the emitter electrode and the collector electrode being connected in circuit relationship with said control circuit, control means having an input and an output, said control means being such as to produce at its output periodic pulses the width of which vary in accordance with the magnitude of a control signal applied to the input of the said control means, said periodic pulses being synchronized with said supply voltage applied to the magnetic amplifier, and circuit means for interconnecting the base electrode and the emitter electrode with the output of the said control means, so that said periodic pulses control the instantaneous voltage between the emitter and the collector electrodes and thus the instantaneous voltage applied by said control circuit to the magnetic amplifier.

7. In a regulator system for controlling an electrical output condition of a generator whose operation is controlled by an exciter having an armature and a field winding, the combination comprising, a magnetic amplifier having an output and a control circuit for varying the magnitude of the output current of the magnetic amplifier, circuit means for interconnecting the output of the magnetic amplifier with the field winding of the exciter, a semiconductive device having three electrodes, other circuit means for interconnecting said control circuit and two of the three electrodes in circuit relationship with the armature of the exciter so that said armature effects a voltage across the said control circuit, means for obtaining a control signal which varies in accordance with the deviation of said electrical output condition from its regulated value, control means having an input and an output, still other circuit means for applying said control signal to the input of the said control means, said control means being such as to produce at its output periodic pulses the width of which vary in accordance with the magnitude of the said control signal applied to the input of the said control means, and further circuit means for interconnecting the remaining electrode of the semiconductive device and one of said two electrodes with the output of the said control means, so that said periodic pulses control the instantaneous voltage across the said two electrodes and thus the instantaneous voltage applied by the said control circuit to the magnetic amplifier.

8. In a regulator system for controlling an electrical output condition of a generator whose operation is controlled by an exciter having an armature and a field winding, the combination comprising, a magnetic amplifier having an output and a control circuit for varying the magnitude of the output current of the magnetic amplifier, circuit means for interconnecting the output of the magnetic amplifier with the field winding of the exciter, means for applying a supply voltage to the magnetic amplifier, a transistor having three electrodes, other circuit means for interconnecting said control circuit and two of the three electrodes in circuit relationship with the armature of the exciter so that said armature effects a voltage across the said control circuit, means for obtaining a control signal which varies in accordance with the deviation of said electrical output condition from the regulated value, control means having an input and an output, still other circuit means for applying said control signal to the input of the said control means, the said control means being such as to produce at its output periodic pulses the width of which vary in accordance with the magnitude of the said control signal applied to the input of the said control means, said periodic pulses being synchronized with said supply voltage applied to the magnetic amplifier, and further circuit means for interconnecting the remaining electrode of the transistor and one of said two electrodes with the output of the said control means, so that said periodic pulses control the instantaneous voltage across the said two electrodes and thus the instantaneous voltage applied by the said control circuit to the magnetic amplifier.

9. In a regulator system for controlling an electrical output condition of a generator whose operation is controlled by an exciter having an armature and a field winding, the combination comprising, a magnetic amplifier having an output and a control circuit for varying the magnitude of the output current of the magnetic amplifier, circuit means for interconnecting the output of the magnetic amplifier with the field winding of the exciter, means for applying a supply voltage to the magnetic amplifier, a junction type transistor having an emitter electrode, a collector electrode, and a base electrode, other circuit means for interconnecting said control circuit and the emitter electrode and the collector electrode of the junction type transistor in circuit relationship with the armature of the exciter so that said armature effects a voltage across the said control circuit, means for obtaining a control signal which varies in accordance with the deviation of said electrical output condition from the regulated value, control means having an input and an output, still other circuit means for applying said control signal to the input of the said control means, the said control means being such as to produce at its output periodic pulses the width of which vary in accordance with the magnitude of the said control signal applied to the input of the said control means, said periodic pulses being synchronized with said supply voltage applied to the magnetic amplifier, and further circuit means for interconnecting the base electrode and the emitter electrode of the junction type transistor with the output of the said control means, so that said periodic pulses control the instantaneus voltage between the emitter and collector electrodes of the junction type transistor and thus the instantaneous voltage applied by the said control circuit to the magnetic amplifier.

No references cited.